United States Patent [19]

Polcaro

[11] 4,126,962
[45] Nov. 28, 1978

[54] PLANT CARE DEVICE

[76] Inventor: Arthur B. Polcaro, 24 Marion St., West Newton, Mass. 02165

[21] Appl. No.: 806,170

[22] Filed: Jun. 13, 1977

[51] Int. Cl.² .................. A01G 1/00; A47L 17/00
[52] U.S. Cl. .................................. 47/1.5; 15/210 R; 15/244 A; 294/99 R
[58] Field of Search ............... 47/1 R, 1.5; 15/244 R, 15/244 A, 214, 210 A, 220 R, 209 R, 210 R; 294/99 R, 2, 3, 33

[56] References Cited

U.S. PATENT DOCUMENTS

| | | | |
|---|---|---|---|
| 277,531 | 5/1883 | Ackermann | 294/3 X |
| 832,317 | 10/1906 | Hinds | 294/99 R |
| 855,949 | 6/1907 | Hoffman | 294/99 R X |
| 1,478,835 | 12/1923 | Peacock et al. | 15/244 A X |
| 1,806,441 | 5/1931 | Baver et al. | 294/99 R |
| 2,490,636 | 12/1949 | Klein | 15/214 |
| 2,546,526 | 3/1951 | Shirley | 15/244 R |
| 2,622,256 | 12/1952 | Vojacek | 15/244 A X |
| 2,819,484 | 1/1958 | Fouse | 15/244 A |
| 2,929,166 | 3/1960 | Sneide | 294/99 R X |
| 2,957,190 | 10/1960 | Stark | 15/244 A X |

FOREIGN PATENT DOCUMENTS

| | | | |
|---|---|---|---|
| 929,758 | 6/1955 | Fed. Rep. of Germany | 47/1.5 |
| 82,498 | 10/1952 | Norway | 15/220 R |
| 1,758 of | 1893 | United Kingdom | 47/1.5 |
| 610,923 | 10/1948 | United Kingdom | 294/99 R |
| 626,404 | 7/1949 | United Kingdom | 15/244 R |

Primary Examiner—Edgar S. Burr
Assistant Examiner—Steven A. Bratlie
Attorney, Agent, or Firm—Robert J. Doherty

[57] ABSTRACT

A plant care device for cleaning and/or the application of fluids to the leaves of decorative foliage plants including a pair of opposed inwardly flexible arms connected at one end thereof for normal outwardly biased disposition with regard to each other in an open position of the device. The other ends of the arms are each provided with an enlarged generally flat headed portion in turn receiving at each inner surface thereof, a fluid absorbable pad, said pads adapted to close upon each other in the closed position of the device with a plant leaf interposed therebetween. The flexibility of the arms enables the device to be gently closed upon the leaf and accordingly enable the cleaning or fluid application tasks to be accomplished without tearing or otherwise breaking a leaf.

1 Claim, 5 Drawing Figures

PLANT CARE DEVICE

BACKGROUND OF THE INVENTION

This invention relates to a device for the caring of plants and more particularly a device which can simultaneously clean and apply fluids including water, fertilizer, leaf gloss materials and the like to one or both sides of the plant leaf. As such, the device has particular utility in the caring for large broad leafed foliage plants. In this manner, then, the leaves of such plants may be moistened or a decorative material such as leaf gloss applied thereto without creating a problem as to cleanup or the contact of such materials with walls, carpeting or other decorative materials normally found in the vicinity of such plants. The invention thus forms the means by which such tasks can be carried out in a more convenient, safe and enjoyable manner.

Presently water, insecticides, leaf gloss materials, etc., are often applied to plants by means of pressure spray or misting devices either hand operated or powered by means of aerosols and the like. With such application the materials also necessarily contact furniture or other household articles in close proximity of the plants and generally create a mess which reduces one's incentive to properly care for one's plants.

It would accordingly be desirable to be able to apply such materials directly to the plant leaves.

Devices of this very general nature but not adapted for use with gentle or fragile objects such as the above discussed decorative plants are known and include those devices disclosed in the following U.S. Patents: U.S. Pat. Nos. 1,478,835 to Peacock et al.; 2,819,484 to Fouse; 2,622,256 to Vojacek; and 2,957,190 to Stark. The devices disclosed therein are adapted for cleaning use with such articles as razor blades and venetian blinds and are not suited for the purposes intended in the present application. From a structural standpoint, that patent which discloses a construction most closely resembling that of the present application is the Fouse patent issued Jan. 14, 1958, which includes a pair of rigid handles 5,6 that are pivotally connected at one end thereof and which include at opposite ends enlarged plates 17 in turn adapted to receive pads 20. The pads may be of foam rubber and accordingly may receive cleaning fluid such as water so that the venetian blinds may be simultaneously cleaned on both top and bottom surfaces thereof. The citation and above discussion of these prior art patents consitutes applicant's Prior Art Statement and in this regard a copy of each such patent is enclosed.

It is a primary object of the present invention to provide a device especially adapted for plant care, in which a soft combination gripping and wiping action may be imparted to the leaves of such plants whereby they may be cleaned, watered or decorative solutions applied thereto.

A further object of the present invention is the provision of a device of the aforementioned type in which opposed flexible handles are adapted to softly grip opposite sides of a plant leaf simultaneously.

A still further object of the present invention is the provision of a construction of the immediately aforementioned type in which the design of such is especially adapted to move between adjacent leaves of such plants so as to care for one such leaf without necessarily contacting adjacent or surrounding leaves.

These and other objects of the invention are provided by a device including opposite generally flat flexible arms having enlarged headed portions in turn adapted to receive a pad of liquid absorbent material. The other ends of the arms are adapted to be interconnected so as to be outwardly biased from each other in a normally open non-use position whereby the arms may be moved towards each other so that the pads contact each other so as to simultaneously contact and apply a soft but effective wiping action to both sides of a leaf.

Other objects, features and advantages of the invention shall become apparent as the description thereof proceeds when considered in connection with the accompanying illustrative drawing.

DESCRIPTION OF THE DRAWING

In the drawing which illustrate the best mode presently contemplated for carrying out the present invention.

DESCRIPTION OF THE INVENTION

Figure 1:
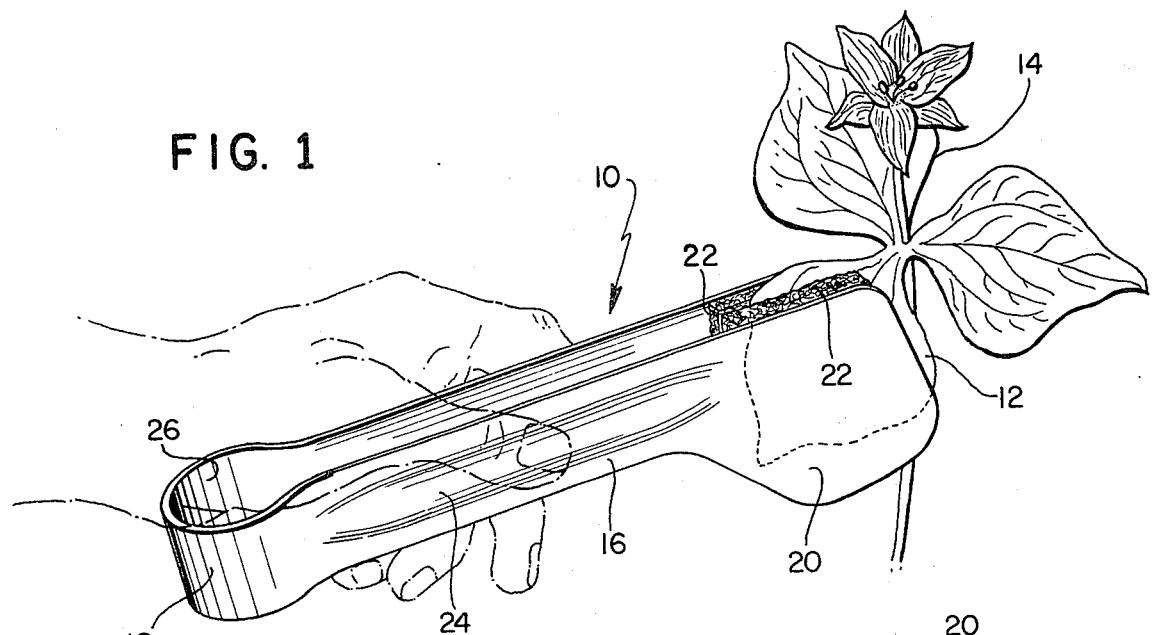
FIG. 1 is a perspective view showing the device of the present invention in use as by the cleaning or application of fluid to a leaf of a plant.
Figure 2:
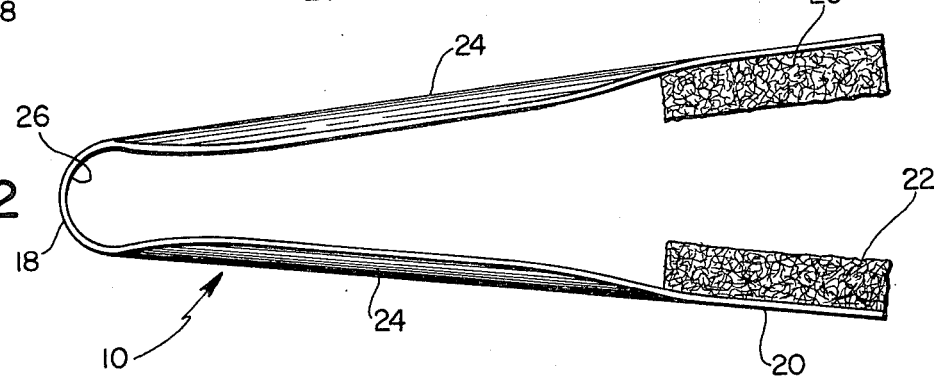
FIG. 2 is a side elevational view of the device shown in FIG. 1 in an open non-use position.

Turning now to the drawing and in particular FIG. 1, a device 10 constructed in accordance with the present invention is shown in use for cleaning or the like of a leaf 12 of a plant 14. The device 10 includes a pair of generally flat arms 16, each of similar configuration. The arms are integrally joined to each other at one end thereof by means of a generally U-shaped connection 18 and are provided at the opposite other thereof with a pair of enlarged or headed portions 20 generally of flat configuration and adapted to be disposed in opposition to each other. The arms are normally outwardly biased from each other as particularly shown in FIG. 2 in an open non-use position, such position preferably being imparted to the device by means of the resilience or memory of the plastic materials from which the device is generally formed. Suitable materials include resinous plastic composition such as polyethylene and polypropylene. The device may be molded in the open position as shown in FIG. 2 by injection molding or the known techniques.

The headed portions 20 are in turn provided with a pad 22 formed from a liquid absorbent material such as a cellular 3. or a interwoven or intermeshed textile product. A suitable composition for such pads includes matted polyester fibers. Each of the arms 16 is in turn provided with a longitudinally orientated outwardly extending stiffening ridge 24 which serves to provide a slight amount of stiffness to the device especially in the open position thereof. It should be understood, however, that the arms when placed in a closed position are inwardly flexible towards each other as best illustrated in FIG. 2. In this matter, then, a soft gentle application of pressure may be applied to a leaf 12 such that it would not be dislodged from its stem or otherwise damaged.

Figure 3:
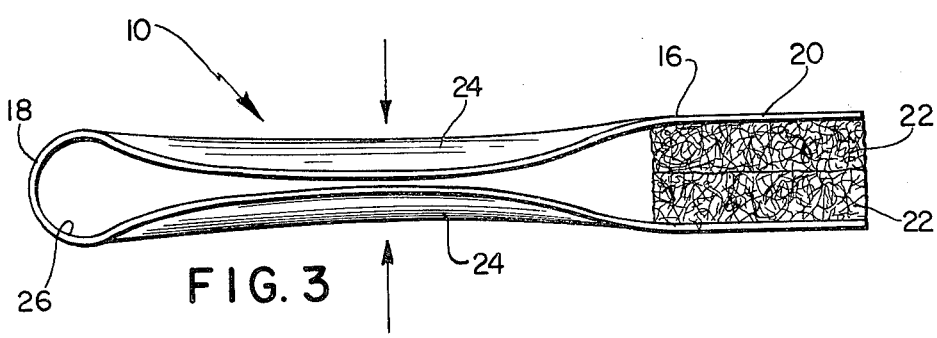
FIG. 3 is a side elevational view similar to FIG. 2 but showing the device in a closed operative position.
Figure 4:
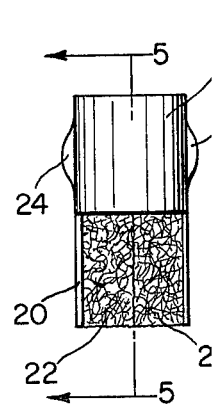
FIG. 4 is an end view of the device taken from the right-hand side of FIG. 3 in a closed position.

In use, for instance for the cleaning of plant leaves, the device would be dipped into warm water so as not to shock the plant, the excess water removed therefrom as by a light contact between the pads 22 to squeeze the excess moisture therefrom and thereafter the device positioned in an at least partially open position on both sides of a leaf and then gently squeezed to contact the leaf. The device is then drawn forwardly so as to wipe clean the upper and lower leaf surfaces simultaneously and leave a moisture film thereon. A similar action can be utilized in the application of fertilizer, insecticide or gloss compositions to the leaves, and in all instances such action is accomplished by a soft flexible contact with the leaf made possible by the inward flexibility of the arms towards each other as best shown in FIG. 3.

Figure 5:
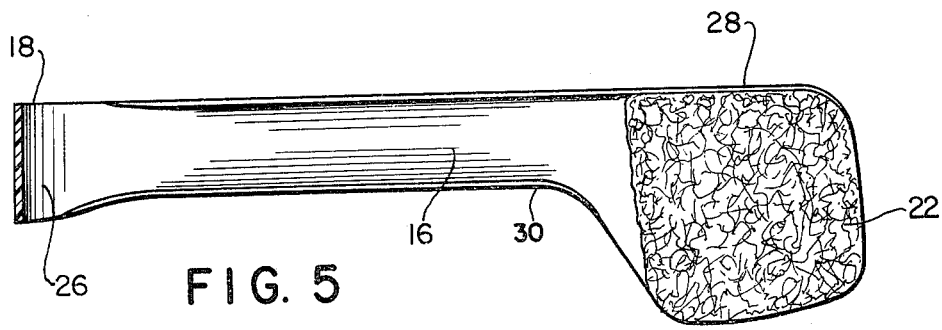
FIG. 5 is a front sectional view taken along the line 5—5 of FIG. 4.

The U-shaped connection 18 between the arms not only serves to outwardly bias the arms from each other but forms a convenient handle or grip element to facilitate the use of the device and for this purpose the connection 18 is outwardly flared or laterally offset at one side thereof as indicated by the reference numeral 26. This outward flared portion 26 accordingly contacts the user's hand in a comfortable position for the application of the slight pressure needed to operate the device. It should also be noted, with particular reference to FIGS. 1 and 5, that the enlarged headed portions 20 are preferably laterally offset from a first edge 28 of the arms 16 towards the opposite or second edges 30 thereof. The first edges of the opposed sides 16 form a relatively straight path whereas the headed portions project outwardly from the second edges 30. This offset configuration enables the device to more easily be manipulated between adjacent leaves of a plant, that is, the straight sides or edges 28 of the arms 16 may be inserted in close proximity to an adjacent leaf without contacting such while the laterally offset headed portions 20 which support the fluid containing pads 22 may completely envelop the leaf on the other side of the device.

As previously explained, the use of the device is in a convenient manner which enables plant care to be a quick and pleasant task. Also, it provides for the application of cleaning or similar solutions directly on plant leaves without contact with furniture, walls, etc., and without contamination of the surrounding atmosphere.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for the cleaning and application of fluids to plant leaves and the like comprising a pair of substantially flat arms connected to each other at one end thereof and normally outwardly biased from each other about said connection in an open position, each of said arms terminating at the other end thereof in an enlarged substantially flat headed portion laterally offset in one direction only, said arms being a single integral strip of relatively thin non-rigid, soft resinous plastic material having a reverse bend at that end opposite said headed portions, said opposite end in the form of an integral U-shaped connection between said arms, portions of said strip forming said connection laterally offset at that side thereof corresponding to the side at which said headed portions are offset so as to form a hand grip, said arms having respectively first and second arm edges, said first and second arm edges being essentially entirely straight and movable from a normal disposition wherein said arms assume a progressively outwardly separated generally V-shaped configuration to a closed operative position wherein said arms are in parallel disposition to each other, said arms having a longitudinally directed outwardly extending central ridge to convey a stiffness to said arms, said ridge slightly inwardly flexible when said device is in said closed operative position, said headed portions forming a continuation of said first arm edges on one side thereof and being laterally offset therefrom in the direction of said second pair of arm edges and extending laterally outwardly beyond said second arm edges on the other side thereof, said headed portions of similar configuration and disposed in opposed disposition relative to each other, each of said headed portions being relatively large and having lateral and longitudinal dimensions which are both substantially greater than the lateral extent of said arms, each headed portion further having a fluid absorbable pad attached to the inner surface thereof, said pads each of an area substantially equal to that of said headed portions and each of a thickness about one half the extent between said arms when disposed in said closed operative position, said pads closing upon one another upon movement of said arms to said closed operative position whereby a plant leaf and the like disposed between said pads is simultaneously contacted thereby on opposite upper and lower surfaces thereof, said arms being formed from relatively thin flexible material and generally longitudinally centrally disposed portions of said arms being inwardly flexible towards each other in said closed operative position and when said pads contact each other whereby soft contact of said plant leaves is provided so as to reduce the likelihood of tearing or breaking said leaves.

* * * * *